United States Patent [19]

Boudot et al.

[11] Patent Number: 4,608,351

[45] Date of Patent: Aug. 26, 1986

[54] LOW PBO-CONTAINING GLASS FOR ELECTRICAL DEVICES

[75] Inventors: Jean E. Boudot; Jean P. Mazeau, both of Avon, France

[73] Assignee: Corning Glass Works, Corning, N.Y.

[21] Appl. No.: 698,408

[22] Filed: Feb. 5, 1985

[30] Foreign Application Priority Data

Mar. 9, 1984 [FR] France ............................ 84 03635

[51] Int. Cl.$^4$ .......................... C03C 3/105; C03C 3/108
[52] U.S. Cl. .......................................... 501/62; 501/61
[58] Field of Search ........................................ 501/61, 62

[56] References Cited

U.S. PATENT DOCUMENTS

| | | | |
|---|---|---|---|
| 3,663,246 | 5/1972 | LaGrouw | 501/62 |
| 3,723,790 | 3/1973 | Dumbaugh, Jr. et al. | 501/61 |
| 3,907,584 | 9/1975 | Wada et al. | 501/62 |
| 3,925,089 | 12/1975 | Howben | 501/61 |
| 4,089,694 | 5/1978 | Thomas et al. | 501/62 |

Primary Examiner—Mark L. Bell
Attorney, Agent, or Firm—C. S. Janes, Jr.

[57] ABSTRACT

The invention relates to the glass industry. It concerns glasses of low lead content characterized in being prepared from glass forming batches consisting essentially, in weight percent on the oxide basis of:

| | | | |
|---|---|---|---|
| $SiO_2$ | 66–70 | BaO | 5–9.5 |
| $B_2O_3$ | 0–3 | PbO | 1.5–5 |
| $Al_2O_3$ | 2–4.5 | MgO + CaO | 0–3.5 |
| $Li_2O$ | 0.5–1.6 | $As_2O_3 + Sb_2O_3$ | 0–1 |
| $Na_2O$ | 7–9.5 | BaO + MgO + CaO | 8–11 |
| $K_2O$ | 5–8.5 | $Li_2O + Na_2O + K_2O$ | 14.5–17 |
| $Na_2O:K_2O$ | <1.7 | | |

A specific application of the invention is the fabrication of electrical devices such as light bulbs.

1 Claim, No Drawings

LOW PBO-CONTAINING GLASS FOR ELECTRICAL DEVICES

BACKGROUND OF THE INVENTION

This invention relates to glasses of low lead oxide content useful for the production of electrical devices.

In electrical devices such as, for example, light bulbs, the envelope of these lamps (incandescent or fluorescent type) is generally composed of an inexpensive glass of the soda-lime type, whereas that part of the lamp supporting the electrical conductors and permitting the evacuation of air from the envelope and subsequent filling with gas is currently produced from a glass of the $R_2O$-$PbO$-$Al_2O_3$-$SiO_2$ (R=Na and K) type containing a large percentage of lead oxide (between 20–25% by weight). Other than the fact that this glass can be sealed to the glass of the envelope and to the electrical conductors, it exhibits a high volume electrical resistivity in order to insure a proper insulation between the conductor wires during operation of the lamp. The envelope glass (soda-lime glass) does not satisfy this last property.

From the standpoint of production and use of the bulbs, the present glasses are perfectly satisfactory. However, the presence of a high lead oxide content involves some disadvantages which one would wish to minimize. To illustrate, the preparation and melting of a glass containing more than 20% lead oxide can lead to dusting of the batch and volatilization of toxic lead compounds which problems require precautions and special equipment in production. On the other hand, the price of the starting material, the source of lead oxide, is high which leads to an expensive glass forming batch. For these reasons, research was conducted to replace the glass of high PbO content with a glass containing no PbO or very little PbO, but which exhibits essentially the same properties. The object of the present invention is to provide such a glass.

The principal properties that the glass should possess, and which also define the lead glasses currently used, are the following: a coefficient of thermal expansion between 25°–300° C. less than about $96.5 \times 10^{-7}$/°C. in order to be capable of sealing to the electrical conductors of DUMET alloy; a softening point or Littleton point ($T_L$) corresponding to a viscosity of $10^{7.6}$ poises less than about 660° C; a volume electrical resistivity at 250° C. greater than $10^{8.5}$ ohm cm; and a viscosity at the highest temperature of devitrification or liquidus greater than about 50,000 poises in order to be able to form the glass without problems of devitrification with current procedures, e.g., drawing tube or cane. For the glasses of the invention, this viscosity corresponds approximately to a temperature of 900° C. Thus, the selected glasses exhibit a liquidus temperature less than 900° C.

Hence, the problem to be resolved consists in finding a region of compositions which, when the PbO content is greatly reduced, permits the formulation of a low cost glass forming batch with the properties mentioned above. Also, research was conducted to obtain a softening point as close as possible to that of the glasses currently used (~630° C.) in order not to profoundly modify the sealing conditions.

SUMMARY OF THE INVENTION

The present invention seeks to provide glasses of low lead content which have properties similar to those of glasses of high lead content and which can advantageously be substituted therefor in the fabrication of various components of electrical articles, in particular light bulbs.

The invention relates to glasses of low lead content characterized in that they are prepared from a glass forming batch consisting essentially, in weight percent on the oxide basis, of

| | | | |
|---|---|---|---|
| $SiO_2$ | 66–70 | $BaO$ | 5–9.5 |
| $B_2O_3$ | 0–3 | $PbO$ | 1.5–5 |
| $Al_2O_3$ | 2–4.5 | $MgO + CaO$ | 0–3.5 |
| $Li_2O$ | 0.5–1.6 | $As_2O_3 + Sb_2O_3$ | 0–1 |
| $Na_2O$ | 7–9.5 | $BaO + MgO + CaO$ | 8–11 |
| $K_2O$ | 5–8.5 | $Li_2O + Na_2O + K_2O$ | 14.5–17 |
| $Na_2O:K_2O$ | <1.7 | | |

The principal glass forming oxide is $SiO_2$. Its lower limit results principally from the sum of the other oxides present in the glass. With respect to its upper limit, it has been observed that above about 70% the liquidus temperature is higher than 900° C. $Al_2O_3$ improves the resistance to devitrification and substantially lowers the liquidus temperature when the content of alkali metal oxides is low. Therefore, the glass will contain at least 2%. This oxide increases the temperature of the softening point of the glass and the high temperature viscosity thereof so that the maximum content thereof is limited to 4.5%.

The effect of alkali earth metal oxides on the coefficient of expansion, the viscosity, and the electrical resistivity of glasses is well known. If one were to consider only those physical properties, there would be some interest in utilizing a maximum amount of $Li_2O$ to achieve the best solution. As a matter of fact, $Li_2O$ permits one to obtain the lowest viscosity for a given coefficient of expansion. Nevertheless, its contribution to the cost of the glass forming batch is very significant and, consequently, for economic reasons its content will not exceed about 1.6%. A minimum of 0.5% $Li_2O$ will be present in order to maintain the softening point and the coefficient of expansion below the fixed limits. Preferably, the glass will contain about 1%.

The total content of alkali metal oxides will comprise between 14.5–17%. Below 14.5% the softening point and the liquidus temperature are raised. Above about 17% the coefficient of expansion goes beyond the limit value. Within the total sum of the alkali metal oxides, $Na_2O$ and $K_2O$ are located in well-defined regions. Below 7% $Na_2O$ the softening point of the glass rises and above 9.5% the coefficient of expansion becomes too high and the electrical resistivity at 250° C. too low. For a $K_2O$ content less than approximately 5%, the liquidus temperature passes 900° C. and this particularly when the concentration of $Al_2O_3$ is low. On the other hand, $K_2O$ has a favorable effect upon electrical resistivity; resistivity decreases at the same time that $K_2O$ decreases. Because of this latter property, the ratio $Na_2O:K_2O$ will be maintained at less than about 1.7. Preferably, it will range around 1.0–1.3 in order to confer to the glass an electrical resistivity at 250° C. of about $10^{8.7}$ ohm cm.

PbO and the alkaline earth oxides also have a favorable effect upon electrical resistivity. BaO is preferable to MgO and CaO because, other than its primary effect upon this property, it permits a lower viscosity to be obtained. A maximum content of 9.5% will be utilized. MgO and/or CaO could be utilized in substitution for a portion of BaO. The minimum content of BaO+-CaO+MgO is of the order of 8%. A BaO content lower than 5% leads to a softening point which is too high and above about 9.5% the coefficient of expansion will be too high, especially in the case of the most interesting glasses, that is to say, those exhibiting a low softening point. A minimum content 1.5% PbO will be maintained in the glass in order to obtain a softening point as low as possible. The maximum quantity of PbO that can be tolerated has been fixed at 5% by weight. Above this limit industrial constraints become extremely important. Preferably, the PbO content will comprise between 2.5–4%.

$B_2O_3$ may be added to lower the coefficient of expansion and improve the electrical resistivity. However, this oxide increases the tendency of the glass to devitrify and increases the viscosity of the glass at low temperature ($T_L$); its content will not exceed 3%. Contents of $B_2O_3$ approaching the maximum of 3% will not be utilized in the presence of a low $Al_2O_3$ content.

$As_2O_3$ and/or $Sb_2O_3$ are added as the preferred fining agents.

PRIOR ART

U.S. Pat. No. 3,663,246 discloses glasses suitable for faceplates for color television picture tubes consisting essentially, in weight percent, of:

| $SiO_2$ | 58–67 | PbO | 2–7 |
|---|---|---|---|
| $Li_2O$ | 0–1 | MgO | 0–3 |
| $Na_2O$ | 2–3 | $Al_2O_3$ | 1–4 |
| $K_2O$ | 11–14 | $As_2O_3 + Sb_2O_3$ | 0.3–0.7 |
| CaO | 3–4.5 | $CeO_2$ | 0.005–0.6 |
| BaO | 11–14 | | |

Those glasses are low in $Na_2O$ and high in both $K_2O$ and BaO.

U.S. Pat. No. 3,723,790 describes glasses useful for sealing DUMET alloy leads to electrical devices consisting essentially, in weight percent, of:

| $SiO_2$ | 63–71 | $Li_2O$ | 1.5–3 |
|---|---|---|---|
| $Al_2O_3$ | 1.5–4 | $Na_2O$ | 1.5–3.5 |
| $B_2O_3$ | 0–1.5 | $K_2O$ | 9–12 |
| $Al_2O_3 + B_2O_3$ | 1.5–4 | $Li_2O + Na_2O + K_2O$ | 14–18 |
| BaO | 7–17 | BaO + PbO | 12–19 |
| PbO | 0–8 | | |

Those glasses are low in $Na_2O$, high in $K_2O$, and generally too high in $Li_2O$ content.

U.S. Pat. No. 3,907,584 is also directed to glasses useful for color television picture tube face plates, the glasses consisting essentially, in weight percent, of:

| $SiO_2$ | 58–66 | $WO_3$ | 0.1–4 |
|---|---|---|---|
| $Al_2O_3$ | 1–4 | PbO | 0.5–3 |
| $K_2O$ | 6–15 | MgO | 0–2 |
| $Na_2O$ | 2–8 | SrO | 0–4.5 |
| CaO | 0.5–4 | $PbO + BaO + WO_3 + SrO$ | >15 |
| BaO | 10–18 | $CeO_2$ | 0.1–0.6 |

Those glasses are free from $Li_2O$, contain an excessive amount of BaO, and require the inclusion of $WO_3$.

U.S. Pat. No. 3,925,089 is again directed to glasses for use as faceplates for color television picture tubes, the glasses consisting essentially, in weight percent, of:

| SrO | 0–12 | $SiO_2$ | 50–75 |
|---|---|---|---|
| $ZrO_2$ | 0–8 | $Al_2O_3$ | 0.5–6 |
| BaO | 0–15 | $B_2O_3$ | <1 |
| PbO | 0–15 | CaO + MgO | <5 |
| $SrO + ZrO_2 + BaO + PbO$ | >8 | $Li_2O + Na_2O + K_2O$ | >13 |

Whereas the composition ranges of the patent are drawn very broadly, the crux of the patented invention is the use of a feldspar component in the batch which has a specific surface area larger than 1 $m^2$/gram and the use of a sand component in the batch which has a specific surface area less than 0.1 $m^2$/gram, not to glass compositions per se. None of the four working examples in the patent has a composition falling within the range of the present inventive glasses.

U.S. Pat. No. 4,089,694 is concerned with glasses designed for sealing to electrical leads (explicitly noting DUMET alloy) into electrical devices, the glasses consisting essentially, in weight percent, of:

| $SiO_2$ | 65–75 | CaO | 4–8 |
|---|---|---|---|
| $Al_2O_3$ | 1–4 | BaO | 0–4 |
| $Na_2O$ | 9–13 | PbO | 0–6 |
| $K_2O$ | 3–6 | $Li_2O$ | 0–2 |
| $Na_2O:K_2O$ | 1.5–4.5 | | |

The BaO content of those glasses is too low and the CaO level too high.

DESCRIPTION OF PREFERRED EMBODIMENTS

The invention is illustrated through the examples of Table I wherein the compositions provided (in weight percent on the oxide basis) are those of the glass forming batch. The analyzed compositions of the glasses obtained may differ slightly from the batch compositions because of partial volatilization of certain constituents, particularly the alkali metal oxides. The principal properties are also reported there: $T_L$ or softening point temperature; the coefficient of thermal expansion between 25°–300° C. ($\alpha_{25}^{300} \times 10^{-7}$/°C.); the volume electrical resistivity at 250° C. ($\rho$) expressed as a logarithm; and the highest temperature of devitrification or liquidus. $T_L$, $\alpha$, and ($\rho$) are determined by conventional methods. The liquidus (Liq.) is determined through observation with a polarizing microscope of the presence or absence of crystals in a sample subjected to a thermal treatment of 17 hours <850° C. in Table I signifies that, after a treatment of 17 hours at a temperature higher or equal to 850° C., no trace of crystallization was observed. In this case the test was interrupted because 850° C. corresponds to a viscosity of approximately 140,000 poises (Example 1), which is perfectly suitable for the production of these glasses.

The glasses are prepared from a glass forming batch consisting essentially of silica, hydrated or calcined alumina, spodumene, sodium carbonate, potassium bicarbonate, litharge, and barium carbonate. The starting materials are selected in order to obtain the lowest batch cost.

The quantity of batch material necessary to obtain 2.5 kg of glass is melted in a platinum crucible at about 1380° C. After melting, the temperature is raised to 1500° C. for homogenization and fining. The glass is poured in the form of bars at about 1275° C. and annealed at 430° C.

the envelope) from this glass (bulbs of small dimensions).

TABLE I

|  | 1 | 2 | 3 | 4 | 5 | 6 | 7 | 8 |
|---|---|---|---|---|---|---|---|---|
| $SiO_2$ | 68.75 | 66.75 | 66.75 | 69.26 | 68.25 | 67.55 | 68.75 | 68.75 |
| $B_2O_3$ | — | — | 3.0 | — | — | — | — | — |
| $Al_2O_3$ | 2.4 | 4.4 | 2.4 | 2.22 | 3.6 | 3.6 | 2.4 | 2.4 |
| $Li_2O$ | 1.0 | 1.0 | 1.0 | 0.71 | 1.6 | 1.0 | 1.0 | 1.0 |
| $Na_2O$ | 8.3 | 8.3 | 8.3 | 7.61 | 8.2 | 9.0 | 8.3 | 8.3 |
| $K_2O$ | 7.2 | 7.2 | 6.2 | 7.76 | 5.0 | 6.5 | 7.2 | 7.2 |
| MgO | — | — | — | — | — | — | 2.0 | — |
| CaO | — | — | — | — | 1.0 | — | — | 3.0 |
| BaO | 8.8 | 8.8 | 8.8 | 8.87 | 8.8 | 8.8 | 6.8 | 5.8 |
| PbO | 3.3 | 3.3 | 3.3 | 3.32 | 3.3 | 3.3 | 3.3 | 3.3 |
| $Sb_2O_3$ | 0.25 | 0.25 | 0.25 | 0.25 | 0.25 | 0.25 | 0.25 | 0.25 |
| $T_L$ | 649 | 652 | 660 | 651 | 657 | 657 | 657 | 658 |
| $\alpha_{25}^{300}$ | 95 | 95 | 92.7 | 96 | 93.3 | 96 | 95 | 96.1 |
| Log | 8.72 | — | — | 8.82 | 8.65 | 8.54 | — | 9.03 |
| Liq. | <850 | <850 | ~875 | ~875 | <850 | <850 | <850 | <850 |

Example 1 is one of the preferred glasses because it exhibits the best compromise among all of the properties, including the cost of the starting batch materials. Table II provides some useful properties of Example 1. It should be noted that this glass possesses a density of 2.60 g/cm$^3$, which can be compared with that of glasses containing a high content of PbO (~22%) and which exhibit densities of about 2.82 g/cm$^3$. This lower density is also a factor in reducing the cost of the glass (a glass of lower mass for equal volume). For example, to use glass No. 1, when it is compared to a glass containing about 22% PbO, it provides a gain of 9–10% over the cost of the glass forming batch.

It should be noted that, besides the application described in the Background of the Invention, one can envisage the production of a complete bulb (including the envelope) from this glass (bulbs of small dimensions).

TABLE II

| Example 1 | |
|---|---|
| Density (g/cm$^3$) | 2.6 |
| Strain Point (°C.) | 409 |
| Annealing Point (°C.) | 449 |
| Working Temperature [10$^4$ poises](°C.) | 1010 |

We claim:
1. Glasses consisting essentially of the following approximate composition:

$SiO_2$ 68.75  $K_2O$ 7.2
$Al_2O_3$ 2.4  BaO 8.8
$Li_2O$ 1.0  PbO 3.3
$Na_2O$ 8.3  $Sb_2O_3$ 0.25

* * * * *

UNITED STATES PATENT AND TRADEMARK OFFICE
CERTIFICATE OF CORRECTION

PATENT NO. : 4,608,351

DATED : August 26, 1986

INVENTOR(S) : Jean L. Boudot et al

It is certified that error appears in the above-identified patent and that said Letters Patent is hereby corrected as shown below:

Column 2, line 29, after "alkali", delete "earth".

Signed and Sealed this

Thirty-first Day of March, 1987

Attest:

DONALD J. QUIGG

Attesting Officer     Commissioner of Patents and Trademarks